(12) United States Patent
Winkler et al.

(10) Patent No.: US 7,821,443 B2
(45) Date of Patent: Oct. 26, 2010

(54) DUAL MODE RADAR METHODS AND SYSTEMS

(75) Inventors: Volker Winkler, Brunnen (DE); Reinhard Feger, Scheffau (AT)

(73) Assignee: Infineon Technologies AG, Neubiberg (DE)

( * ) Notice: Subject to any disclaimer, the term of this patent is extended or adjusted under 35 U.S.C. 154(b) by 246 days.

(21) Appl. No.: 12/029,871

(22) Filed: Feb. 12, 2008

(65) Prior Publication Data

US 2009/0201194 A1    Aug. 13, 2009

(51) Int. Cl.
*G01S 13/00* (2006.01)
*G01S 13/42* (2006.01)

(52) U.S. Cl. .................... 342/70; 342/146; 342/79; 342/81; 342/139; 342/155

(58) Field of Classification Search .................. 342/133, 342/74, 79, 81, 139, 146–147, 155–158, 342/445–446
See application file for complete search history.

(56) References Cited

U.S. PATENT DOCUMENTS

| | | | |
|---|---|---|---|
| 3,167,765 A | | 1/1965 | Stabilito |
| 3,611,370 A | * | 10/1971 | Frasure et al. ............. 342/82 |
| 5,107,273 A | * | 4/1992 | Roberts ................... 342/417 |
| 5,132,689 A | * | 7/1992 | Van Wyk ................... 342/96 |
| 5,784,022 A | | 7/1998 | Küpfer |
| 7,457,385 B2 | * | 11/2008 | Feher ...................... 375/347 |
| 2003/0219035 A1 | * | 11/2003 | Schmidt ................... 370/478 |
| 2009/0201194 A1 | * | 8/2009 | Winkler et al. ............ 342/146 |
| 2009/0207093 A1 | * | 8/2009 | Anreddy et al. ........... 343/876 |

FOREIGN PATENT DOCUMENTS

GB    2115984 A    *  9/1983

OTHER PUBLICATIONS

"Improvement of Angular Resolution of a Millimeterwave Imaging System by Transmitter Location Multiplexing", Norbert Kees, Edgar Schmidhammer and Jürgen Detlefsen, Microwave Systems Conference, 1995, Conference Proceedings, IEEE NTC '95, May 17-19, 1995, 4 pgs.

"Calibration Block for Digital Beam Forming Antenna", J. Piotr Starski, Antennas and Propagation Society, International Symposium, 1995, AP-S, Digest, vol. 4, Jun. 18-23, 1995, pp. 1978-1981.

* cited by examiner

*Primary Examiner*—John B Sotomayor
(74) *Attorney, Agent, or Firm*—Eschweiler & Associates, LLC

(57) ABSTRACT

One embodiment relates to a dual mode radar transceiver. The dual mode transceiver includes a plurality of transmit channels. Each of the plurality of transmit channels is adapted to switch between a first mode and a second mode. The first mode includes a first combination of the plurality of transmit channels adapted to concurrently transmit outgoing signals. The second mode includes a plurality of different combinations of the plurality of transmit channels. Each of the plurality of different combinations has fewer transmit channels than the first combination. Other methods and systems are also disclosed.

25 Claims, 10 Drawing Sheets

DUAL MODE RADAR METHODS AND SYSTEMS

FIELD OF INVENTION

The present invention relates generally to radar methods and systems, and more particularly to dual mode radar methods and systems.

BACKGROUND OF THE INVENTION

Radar is a system that uses electromagnetic waves to identity the range, angle, and/or velocity of both moving objects and stationary targets. For example, radar is often used to detect weather conditions, ships, aircraft, motor vehicles, geological formations, and can also be used for many other applications.

As will be appreciated from the above discussion and embodiments described herein, there is an on-going need for improvements in radar systems.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

One embodiment relates to a dual mode radar transceiver. The dual mode transceiver includes a plurality of transmit channels. Each of the plurality of transmit channels is adapted to switch between a first mode and a second mode. The first mode includes a first combination of the plurality of transmit channels adapted to concurrently transmit outgoing signals. The second mode includes a plurality of different combinations of the plurality of transmit channels. Each of the plurality of different combinations has fewer transmit channels than the first combination.

The following description and annexed drawings set forth in detail certain illustrative aspects and implementations of the invention. These are indicative of only a few of the various ways in which the principles of the invention may be employed.

DETAILED DESCRIPTION OF THE INVENTION

Figure 1:
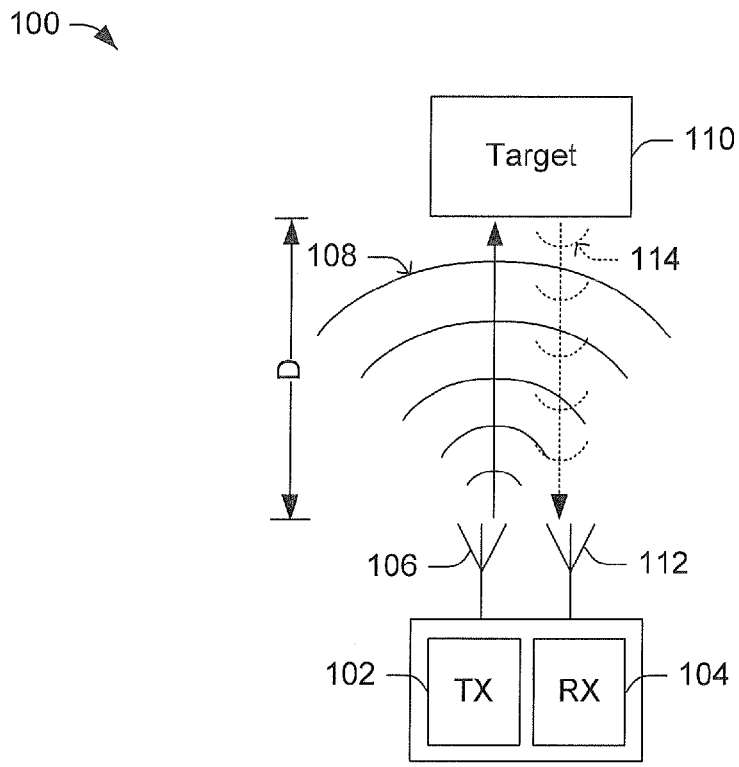
FIGS. 1-2 show a FMCW radar system that includes a single transmitter and a single receiver.

One or more implementations of the present invention will now be described with reference to the attached drawings, wherein like reference numerals are used to refer to like elements throughout. Although some embodiments described herein are particularly useful in automotive radar systems, the concepts are applicable to other radar applications as well. In automotive radar systems tradeoffs between improved angle detection and long-range detection may be particularly useful where targets, such as several nearby vehicles, could be at the same range (e.g, vehicles in adjacent lanes on a highway) relative to the radar transceiver.

Some applications of the present invention may be used with respect to frequency modulated continuous wave (FMCW) radar systems, while other applications may use other types of radar systems, such as pulsed radar systems, for example. FIG. 1 shows a FMCW radar system 100 that include a transmitter 102 and a receiver 104. The transmitter 102 includes an antenna 106 for sending a transmitted signal 108, such as a radio wave or other electromagnetic wave, towards a target 110. Similarly, the receiver 104 includes an antenna 112 for receiving a scattered signal 114 that is reflected from the target 110.

Figure 2:
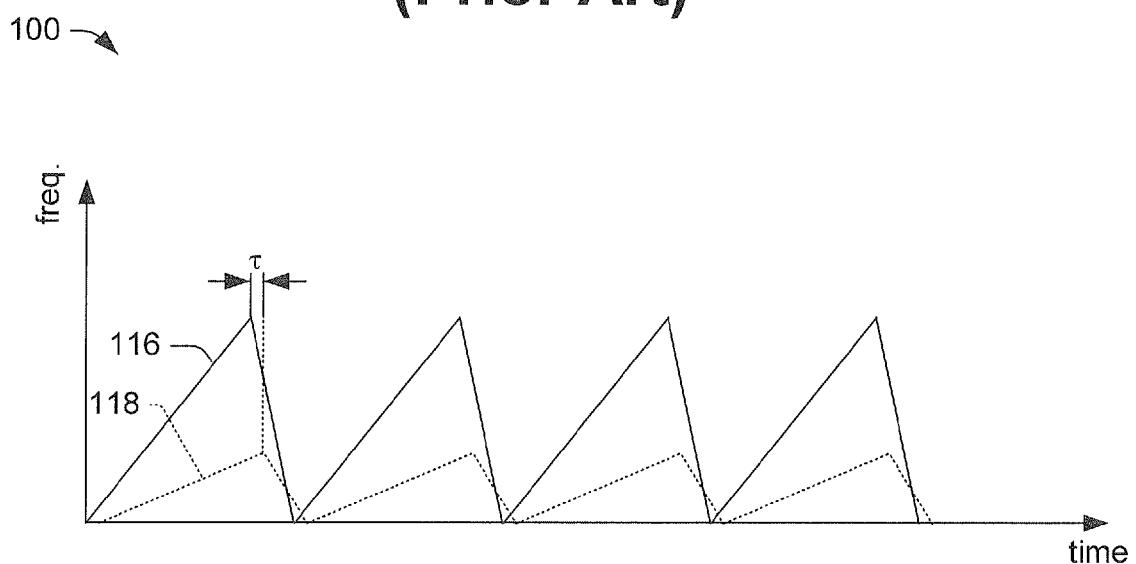

To determine a distance to the target, the transmitter 102 sends the transmitted signal 108 as a frequency ramp 116 whose frequency varies as a function of time, for example, as shown in FIG. 2. After the transmitted signal 108 is sent, there is some delay, $\tau$, before the scattered signal 114 is received as a delayed frequency ramp 118 back at the receiver 104. Because the transmitted and scattered signals 108, 114 travel a total distance of 2D at the speed of light, c; the delay, $\tau$, will be directly proportional to the distance, D, to the target 110 (i.e., $\tau=2D/c$). Thus, by measuring the delay, $\tau$, between the transmitted and scattered signals 108, 114, the radar system 100 can monitor the distance to the target 110.

The FMCW radar system 100 can monitor the velocity of the target by using a series of different ramps, or by tracking the distance as a function of time. In this way, the FMCW radar system 100 can determine the distance and velocity of the target 110. However, in many situations, a radar user would also like to know an incident angle of a target in addition to its distance and velocity. Unfortunately, the FMCW radar system 100, which uses a single transmitter and single receiver, cannot accurately determine the incident angle of a target.

Figure 3:
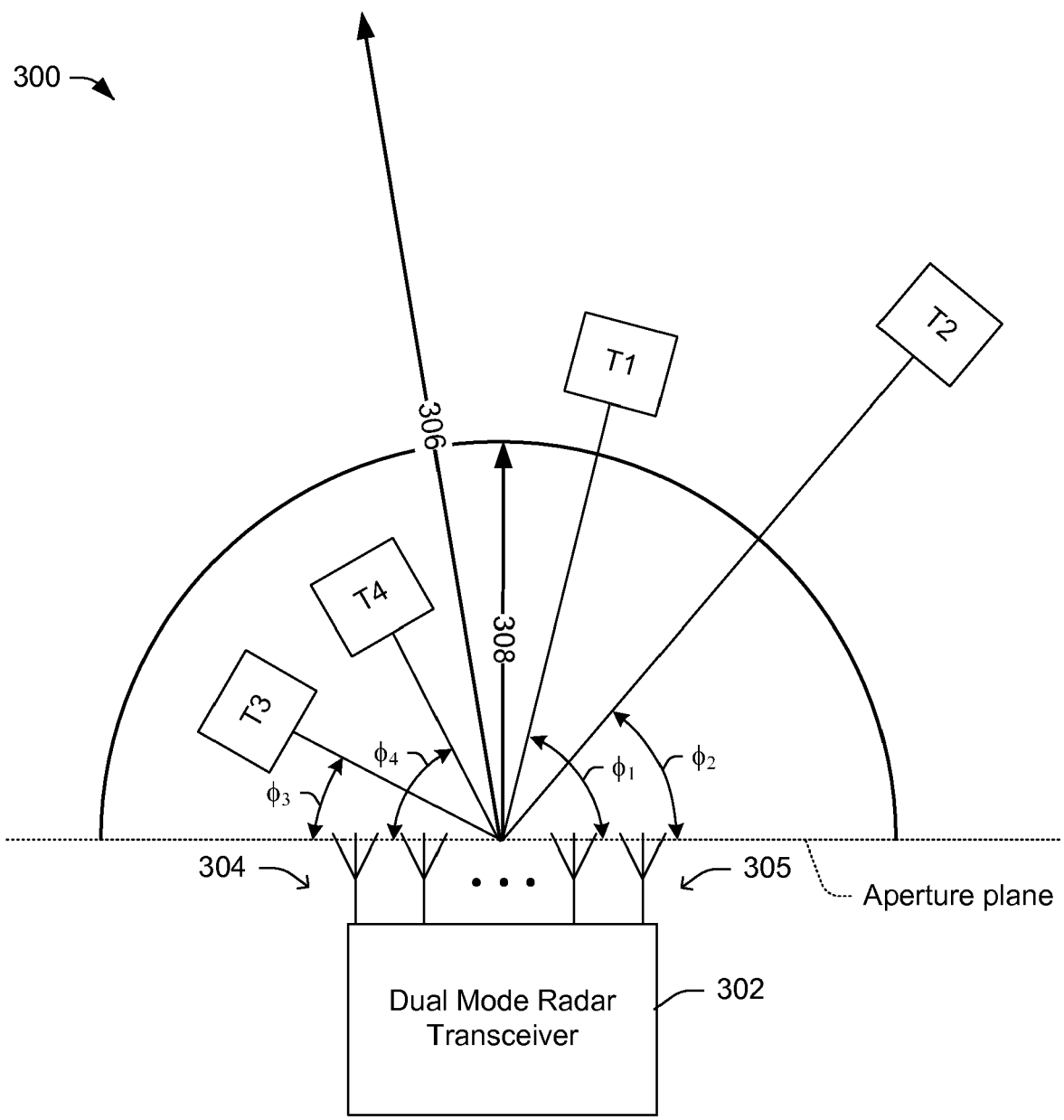
FIG. 3 shows a conceptual diagram of an embodiment of a dual mode radar system in accordance with the present invention.

Referring now to FIG. 3, an embodiment of a dual-mode radar system 300 in accordance with aspects of the invention is depicted. The dual mode radar system 300 includes a dual mode radar transceiver 302 having multiple transmit channels 304 and multiple receive channels 305. These multiple transmit and receive channels 304, 305 allow the dual mode radar transceiver 302 to switch between a first mode and a second mode, thereby balancing tradeoffs between long-range detection and improved angle detection.

The first mode, which may also be referred to as a long-range mode in some embodiments, can detect an incident angle of a target within a long-range 306, in addition to detecting the target's velocity and range. For example, in the illustrated embodiment, the dual mode transceiver 302 uses the long-range mode to detect velocities, ranges, and/or incident angles respectively associated with long-range targets T1, T2 and short-range targets T3, T4. To facilitate this functionality, the multiple transmit channels 304 are concurrently on (i.e., transmit outgoing signals), thereby providing more output power and a greater gain for long-range detection.

During the second mode, which may be referred to as a short-range and/or improved angle detection mode, the dual mode radar transceiver 302 operates within the short-range 308. Although this second mode may be generally unable to detect information for the long-range targets T1, T2, it can more accurately measure incident angles ($\phi_3$, $\phi_4$) for the short-range targets (T3, T4, respectively) than is achievable during the long-range mode. Further, while the long-range mode may be unable to resolve the incident angles of two targets at the same range, the short-range mode can resolve incident angles ($\phi_3$, $\phi_4$) associated with the short-range targets (T3, T4, respectively), even if the two short range targets appear to have the same range and same velocity. To facilitate this functionality during the short-range mode, the multiple transmit channels 304 are sequentially switched on and off. By changing between the first and second modes, the dual mode radar transceiver 302 strikes a balance between long-range detection and improved angle detection.

During the short-range mode, the dual mode radar transceiver 302 can transmit outgoing signals over a relatively high bandwidth. Conversely, during the long-range mode the dual mode radar transceiver 302 can transmit outgoing signals over a relatively-low bandwidth. This relatively-low bandwidth increases the signal-to-noise ratio, thereby facilitating long-range detection of targets. In one embodiment, the relatively low bandwidth in the long-range mode provides an additional gain of approximately:

$$G_{BW} = \frac{B_{SR}}{B_{LR}},$$

where $B_{SR}$ is the bandwidth used during the short-range and $B_{LR}$ is the bandwidth used during the long-range. During the long-range, the total gain is $G_{Ant}+G_{BW}$, where $G_{Ant}$ is the gain of the antenna. In view of the radar equation, the range for the dual mode radar system is increased by a factor of $\alpha_r$ during the long-range mode:

$$a_r = \sqrt[4]{G_{Ant} * G_{BW}}.$$

For example, in one embodiment, the long-range mode has a frequency bandwidth of approximately 200 MHz, and the short-range mode has a frequency bandwidth of approximately 1 GHz, so $G_{BW}$=5. If $G_{ant}$=6 dB, the range in the long range mode would be increased by a factor of about 2.1 over that of the short range. Accordingly, if the short-range had a range of about 30 m, the long-range would have a range of about 63 m. These values are merely examples, and actual gains could vary widely depending on many parameters, such as antenna gain, noise figure, ramp sequence, etc.

Figure 4:
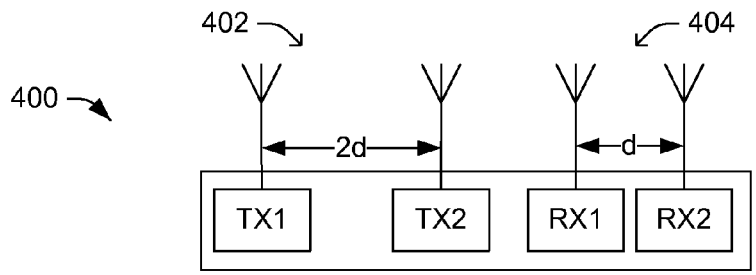
FIG. 4 shows an embodiment of a dual mode radar transceiver having two transmit channels and two receive channels in accordance with the present invention.

FIG. 4 shows a more detailed embodiment of a dual mode radar transceiver 400 that can switch between first and second modes. For purposes of clarity, this dual mode radar transceiver 400 includes two transmit channels 402 (i.e., a first transmit channel TX1 and a second transmit channel TX2) and two receive channels 404 (i.e., a first receive channel RX1 and a second receive channel RX2), but in general could have any number of transmit and receive channels. In the illustrated embodiment, phase centers of the transmit channels are spaced apart by a distance of approximately 2 d, while phase centers of the receive channels are spaced apart by a distance of approximately d, as shown.

Figure 5:
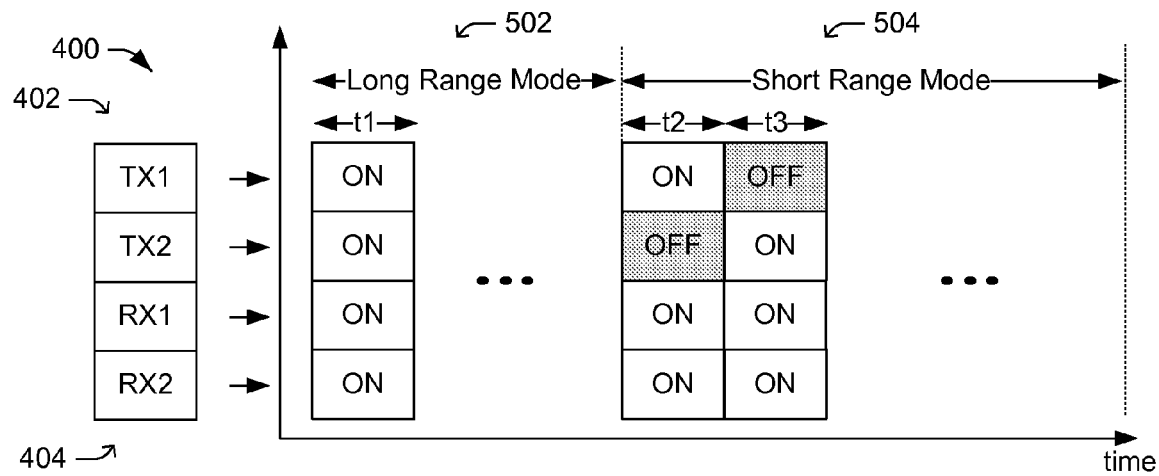
FIG. 5 shows an embodiment for varying the transmit channels and receive channels of the embodiment of FIG. 4 as a function of time to achieve a dual mode in accordance with the present invention.

FIG. 5 shows one embodiment of variations in the transmit channels 402 and receive channels 404 as a function of time to facilitate dual mode functionality. During the long-range mode 502 the first and second transmitters TX1, TX2 are concurrently switched on at time t1. This allows the dual mode radar transceiver 400 to detect the velocity and range of targets within a long range, for example, by using FMCW radar techniques. Further, because multiple transmit channels are employed, the dual mode radar transceiver 400 can also measure the incident angles of these targets with a first angle accuracy.

During the short-range mode 504, in contrast, the first and second transmitters TX1, TX2 are sequentially switched on and off. This allows the dual mode transceiver 400 to synthesize multiple independent propagation paths to accurately measure the incident angles of targets within a short-range. Thus, during a second time (t2) the first transmitter TX1 is on and the second transmitter TX2 is off; but during a third time (t3) the first transmitter TX1 is off and the second transmitter TX2 is on. By switching the two transmit channels on and off, four independent propagation paths can be used to calculate the angle of incidence for each short-range target. In this way, the incident angle of short-range targets can be measured with a second angle accuracy that is greater than the first angle accuracy achieved during the long-range mode.

Accordingly, FIGS. 4-5 show an example of a dual mode transceiver having three transmit channel configurations. The first transmit channel configuration corresponds to t1, in which a first combination of transmit channels (i.e., TX1 and TX2) are on. The second transmit channel configuration corresponds to t2, in which a second combination of transmit channels (i.e., TX1) is on. Lastly, the third transmit channel configuration corresponds to t3, in which a third combination of transmit channels (i.e., TX2) is on. Although the embodiment in FIGS. 4-5 uses all the transmit channels during the long-range mode 502, other embodiments use substantially all of the transmit channels or only enough transmit channels to obtain an increase in range.

Although FIGS. 4-5 have been illustrated and discussed in the context of two transmit channels, in other embodiments a dual mode radar transceiver could have any number of transmit channels. Thus, more generally, a dual-mode transceiver can include multiple transmit channels $N_{TX}$ that can be arranged in a number of transmit channel configurations, where each transmit channel configuration has a unique combination of transmit channels. In some embodiments, the number of TX channels may be limited to between two and four. This is because the maximum Doppler frequency and therefore the maximum velocity of targets that is detectable is reduced as the number of transmit channels increases.

The dual mode transceiver 400 can also include any number of receive channels $N_{RX}$. Generally, a dual mode transceiver with more receive channels will exhibit higher performance (e.g., angle resolution) than a dual mode transceiver with fewer receive channels. For example, with three receive channels the total spacing between the receive antennas is 3 d, or in general $N_{RX}$d, where d is the spacing between adjacent receive antennas. Then it is possible to differentiate between more targets and to improve the accuracy and robustness of the method. The number of synthesized channels is $N_{RX}*N_{TX}$.

FIGS. 4-5 show an embodiment in which the first and second receive channels RX1, RX2 are concurrently on for each time period. As will be described in more detail with respect to FIG. 7 below, this functionality can be enabled by mixers respectively associated with the receive channels. This allows the transmitted signal to be mixed with scattered signals respectively received on the receive channels, thereby down-converting the scattered signals to respective baseband signals for parallel processing.

Figure 6:
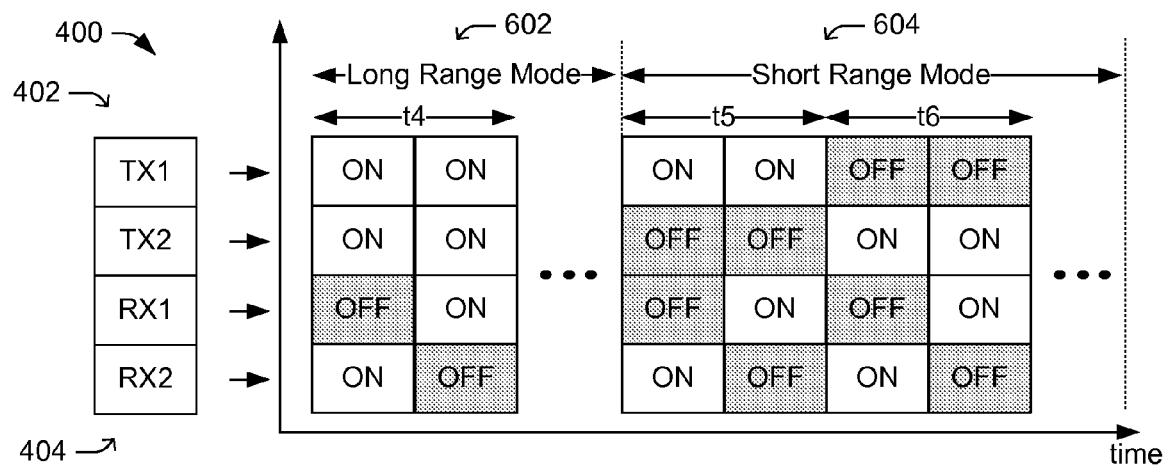
FIG. 6 is another block diagram of an embodiment for varying the transmit channels and receive channels of the embodiment of FIG. 4 as a function of time to achieve the dual mode in accordance with the present invention.

FIG. 6 shows another embodiment in which the receive channels are sequentially switched on and off while a transmit channel configuration is continuously applied. A multiplexer can be used to switch several receive channels to one IF-Amplifier and filter chain with subsequent A/D-Converter. This embodiment may save some hardware in comparison with the embodiment of FIG. 5 but requires more processing time due to the serial nature of the processing, which limits the maximum velocity that is detectable for targets. Other embodiments may blend the approaches of FIGS. 5-6 to achieve a desired balance of performance and cost. As shown in FIG. 6, during time t4 a first transmit channel configuration is continuously applied, while the transceiver changes from a first receive channel configuration (i.e., RX1 off, RX2 on) to a second receive channel configuration (i.e., RX1 on, RX2 off). Similar functionality is shown for the other transmit channel configurations. Therefore, FIG. 6 shows an embodiment in which the receive channels can be changed between or among a number of different receive channel configurations while a given transmit channel configuration is continuously applied.

Figure 7:
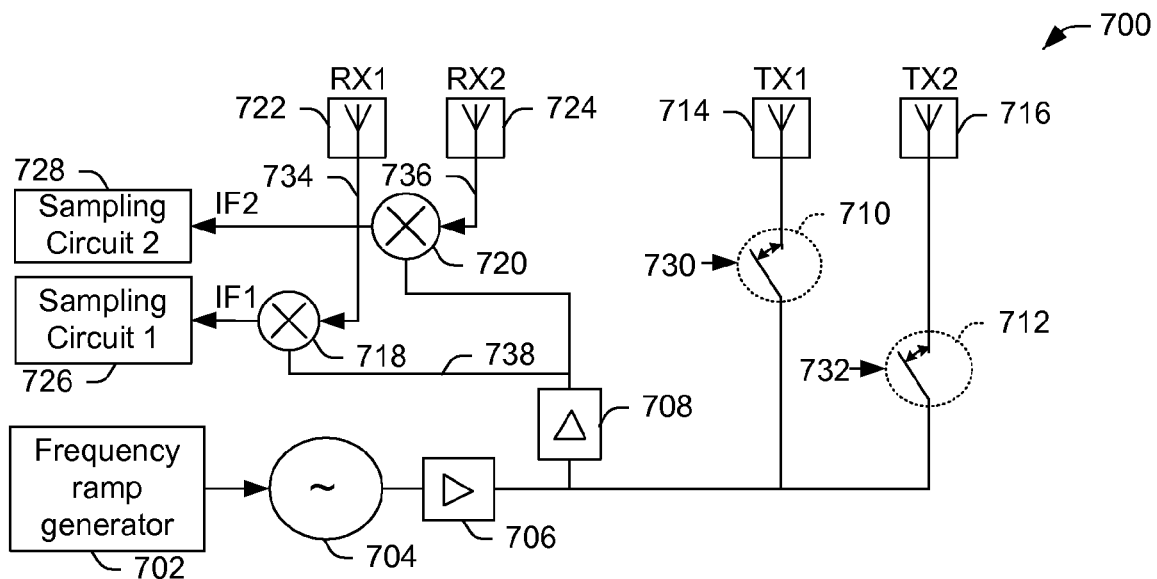
FIG. 7 is a circuit diagram illustrating one embodiment of a dual mode radar transceiver.

Turning now to FIG. 7, circuitry 700 for a dual mode radar transceiver, such as previously described with respect to FIGS. 4-5, is depicted. As shown, the circuitry 700 includes a frequency ramp generator 702; a voltage controlled oscillator (VCO) 704; an output buffer 706 and a local oscillator (LO) buffer 708; first and second switches 710, 712 associated with first and second transmit antennas 714, 716, respectively; first and second mixers 718, 720 associated with first and second receive antennas 722, 724, respectively; and first and second sampling circuits 726, 728 associated with the first and second receive channels, respectively.

During operation, the frequency ramp generator 702 provides a series of frequency ramps to the VCO 704. These frequency ramps can facilitate FMCW radar operation in one embodiment.

The VCO 704 provides a time-varying analog voltage to output buffer 706, which provides outgoing signals towards the first and second switches 710, 712.

The first and second switches 710, 712, respectively, selectively transmit the outgoing signals over the first and second antennas 714, 716, respectively, as a function of first and second control signals 730, 732, respectively. In one embodiment, the first and second switches are power amplifiers. During the long range mode, the first and second control signals 730, 732 can continuously close the first and second switches 730, 732, respectively. In this way, the first and second transmit channels can both continuously transmit outgoing signals during the long-range mode to facilitate long-range detection. During the short range mode, in contrast, the first and second control signals 730, 732 can switch the first and second switches 730, 732 on and off. In this way, a unique combination of transmit antennas can transmit an outgoing signal during a given time period in the short range mode.

After the outgoing signals are transmitted, they may reflect from a target, and be received as first and second scattered signals 734, 736 at the first and second receive antennas 722, 724, respectively.

The first mixer 718 can mix the first scattered signal 734 with an LO signal 738 to provide a first down-converted or baseband signal IF1. Similarly, the second mixer 720 can mix the second scattered signal 736 with the LO signal 738 to provide a second down-converted or baseband signal IF2. These down-converted or baseband signals IF1, IF2 may contain phase, frequency, and/or amplitude information related to the position, velocity, and/or incident angle of the target from which the scattered signals reflected.

Figure 8:
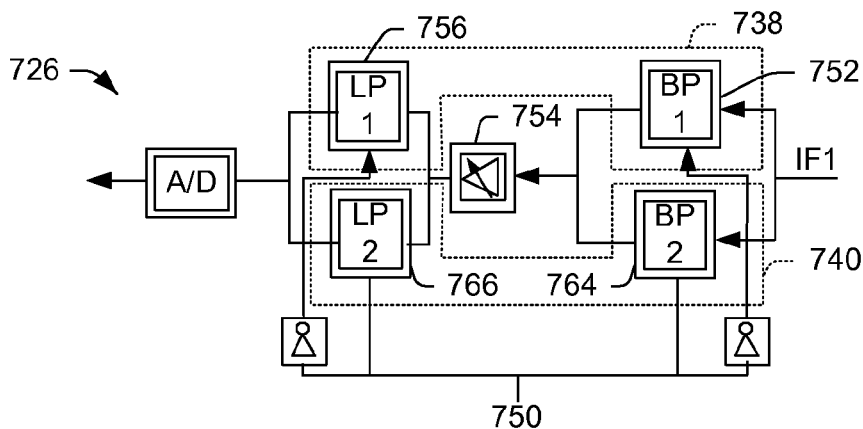
FIG. 8 is a circuit diagram illustrating one embodiment of a first sampling circuit.
Figure 9:
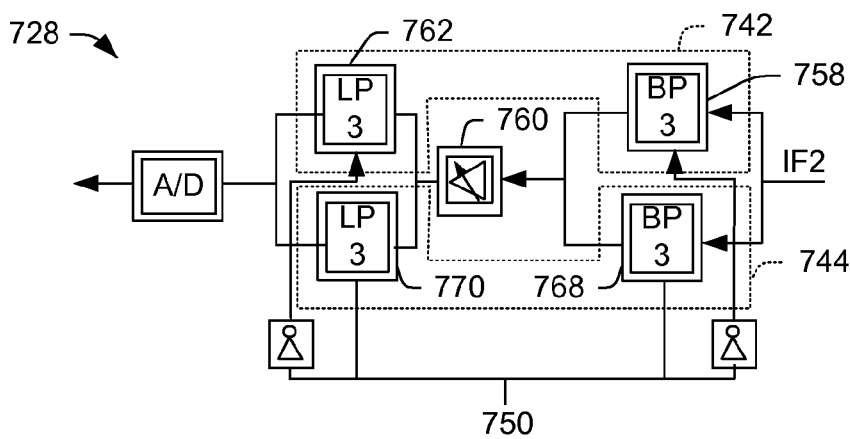
FIG. 9 is a circuit diagram illustrating one embodiment of a second sampling circuit.

The down-converted signals IF1, IF2 are then processed by the first and second sampling circuits 726, 728, respectively. These sampling circuits apply different filtering and amplification schemes to the down-converted signals depending on whether the dual mode transceiver is operating in the long-range detection mode or the improved angle detection mode. For example, the long-range mode may have a high-pass characteristic so that scattered signals from nearby targets and internal reflections from the transceiver are suppressed. This will allow a high amplification to be selected in a variable gain amplifier in the sampling circuits. FIGS. 8-9 show a more detailed embodiment of these sampling circuits.

As FIGS. 8-9 show, the first sampling circuit 726 can include a first set of filtering circuits 738 and a second set of filtering circuits 740. The second sampling circuit 728 can include a third set of filtering circuits 742 and a fourth set of filtering circuits 744. A common control signal 750 causes the first and third sets of filtering circuits 738, 742 to be used during the long range mode and causes the second and fourth sets of filtering circuits 740, 744 to be used during the short range mode.

During the long-range mode, the control signal 750 is asserted, which causes the first down-converted signal IF1 to be filtered by a first band-pass filter 752, then amplified by a variable gain amplifier 754, and then filtered by a first low-pass filter 756. The assertion of the control signal 750 also causes the second down-converted signal IF2 to be filtered by a second band-pass filter 758, then amplified by a variable gain amplifier 760, and then filtered by a second low-pass filter 762. During the short range mode, the control signal 750 is de-asserted, which causes the first down-converted signal IF1 to be filtered by a third band-pass filter 764, then amplified by the variable gain amplifier 754, and then filtered by a third low-pass filter 766. The de-assertion of the control signal 750 also causes the second down-converted signal IF2 to be filtered by a fourth band-pass filter 768, then amplified by the variable gain amplifier 760, and then filtered by a fourth low-pass filter 770.

Figure 10:
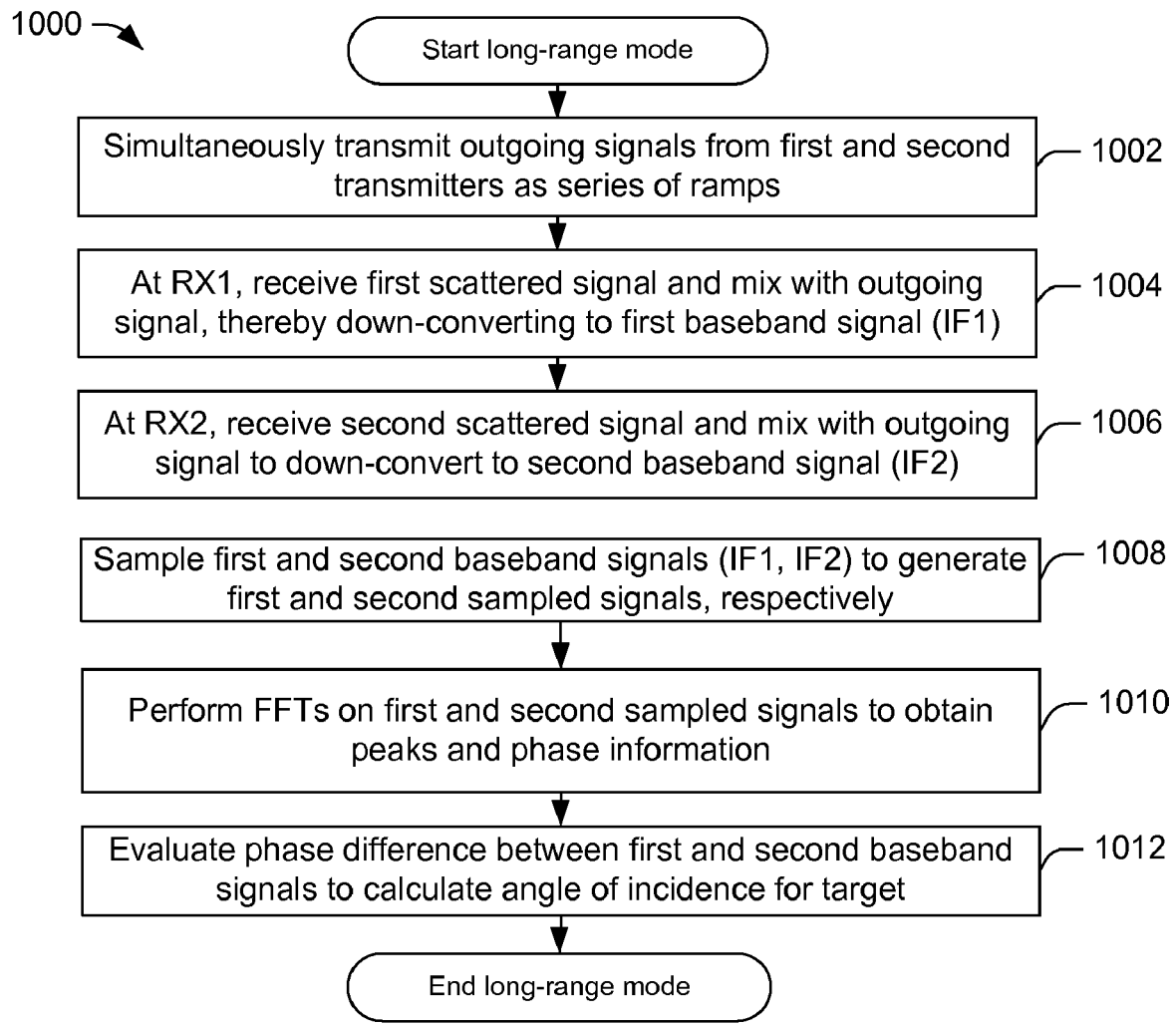
FIG. 10 is a flowchart illustrating an embodiment of a long-range detection method.
Figure 11:
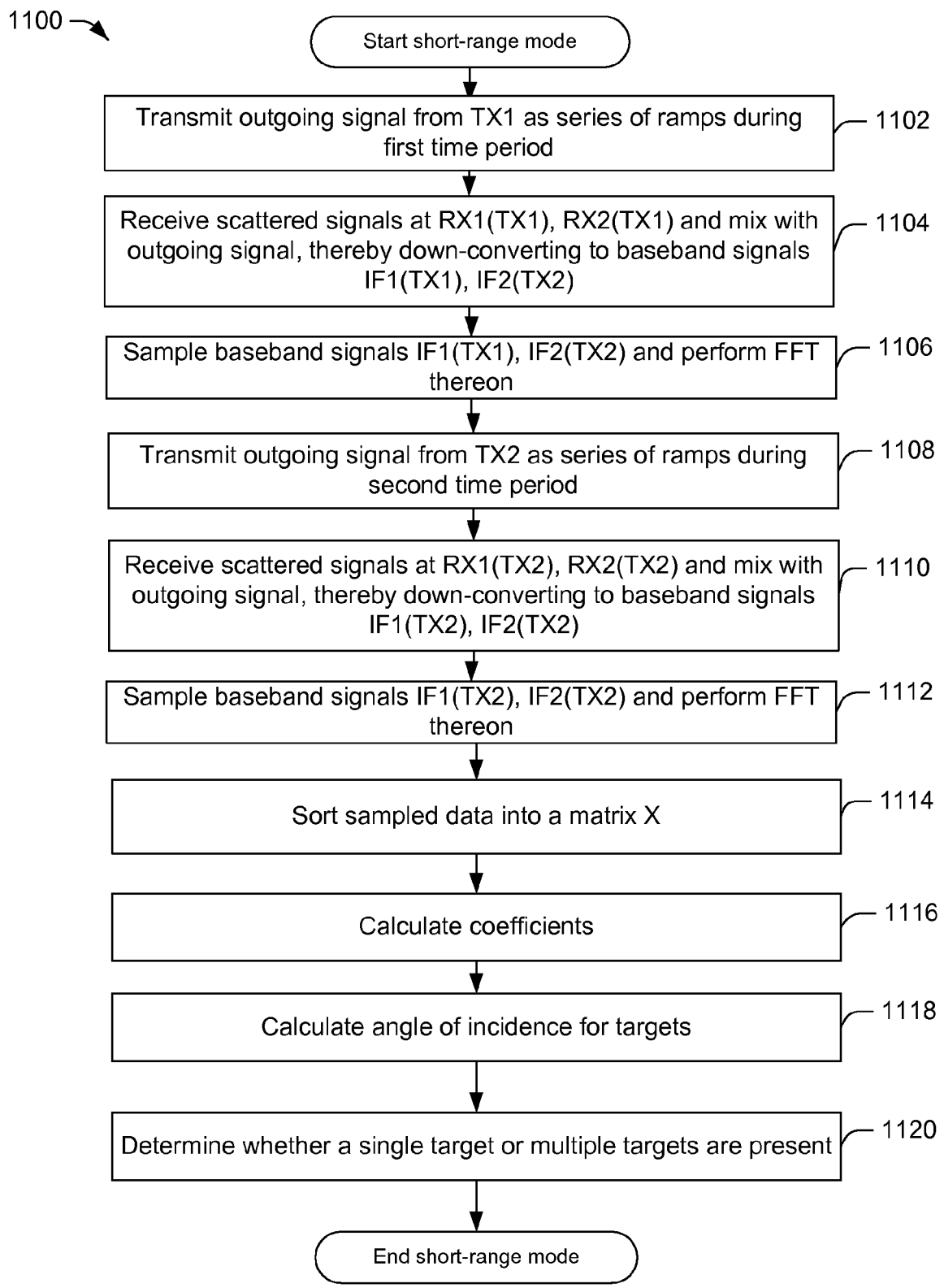
FIG. 11 is a flowchart illustrating an embodiment of a short-range detection method.

Now that some examples of systems that can achieve advantageous radar techniques have been discussed, reference is made to FIGS. 10-11, which show methods in accordance with some aspects of the invention. FIG. 10 shows a long-range detection method 1000, while FIG. 11 shows a short-range, improved angle method 1100. While these methods are illustrated and described below as a series of acts or events, the present invention is not limited by the illustrated ordering of such acts or events. For example, some acts may occur in different orders and/or concurrently with other acts or events apart from those illustrated and/or described herein. In addition, not all illustrated steps may be required to implement a methodology in accordance with one or more aspects of the present invention. Further, one or more of the acts depicted herein may be carried out in one or more separate acts or phases. While reference may be made below and in the drawings to various structures and elements depicted and described herein, such references are made for the purpose of describing example embodiments, and the illustrated steps and methods are in no way limited in their implementations to or by these structural references.

Referring now to FIG. 10, one can see the long-range detection method starts at 1002 when an outgoing signal is simultaneously transmitted from the first and second transmitters as a series of ramps.

In 1004 and 1006, the outgoing signal reflects off a target, causing first and second scattered signals to be received at first and second receivers, RX1, RX2, respectively. These scattered signals are then mixed with the outgoing signal, thereby down-converting the scattered signals to down-converted signals or baseband signals IF1, IF2. Depending on the implementation, blocks 1004 and 1006 could be carried out serially or in parallel.

In 1008, the first and second baseband signals IF1, IF2 are sampled to generate first and second sampled signals, respectively.

In 1010, fast Fourier transforms (FFTs) are performed on the first and second sampled signals to obtain peaks and phase information.

In 1012, the phase difference between the first and second baseband signals IF1, IF2 is evaluated with the aid of the peaks and phase information to calculate the position, velocity, and angle of incidence for the target from which the scattered signals reflected. In one embodiment, the phase difference is measured at a peak in the FFT, and then the incident angle can be calculated according to:

$$\Delta \Psi = \frac{2\pi d \sin\theta_1}{\lambda} \quad (1)$$

where $\Delta\Psi$ is the phase difference at a peak, d is the distance between the phase centers of the dual mode transceiver, $\theta_1$ is the incident angle for the target, and $\lambda$ is the wavelength of the outgoing signal.

Referring now to FIG. 11, a flowchart for the short-range mode is depicted. At 1102, during a first time period an outgoing signal is transmitted from the first transmitter TX1 as a series of ramps. During this time, the second transmitter TX2 is off (i.e., is not transmitting a signal that substantially interferes with the outgoing signal transmitted by the first transmitter TX1).

In 1104, the outgoing signal reflects off a target, causing the first and second receivers, RX1, RX2 to receive first and second scattered signals RX1 (TX1), RX2(TX1), respectively. The first and second scattered signals RX1 (TX1), RX2(TX1) are mixed with the outgoing signal to provide down-converted or baseband signals IF1 (TX1), IF2(TX1).

In 1106, the baseband signals IF1 (TX1), IF2(TX1) are sampled and an FFT is performed thereon.

At 1108, during a second time period an outgoing signal is transmitted from the second transmitter TX2 as a series of ramps. During this second time, the first transmitter TX1 is off.

In 1110, the outgoing signal reflects off a target, causing the first and second receivers, RX1, RX2 to receive third and fourth scattered signals RX1 (TX2), RX2(TX2), respectively. The third and fourth scattered signals RX1 (TX2), RX2(TX2) are mixed with the outgoing signal to provide down-converted or baseband signals IF1 (TX2), IF2(TX2).

In 1112, the baseband signals IF1 (TX2), IF2(TX2) are sampled and an FFT is performed thereon.

In 1114, the data is processed by a high resolution spectral estimation method and therefore the data from the synthesized channels is sorted into a matrix X, $$X = \begin{bmatrix} x_s[L-1] & \cdots & x_s[0] \\ \vdots & \ddots & \vdots \\ x_s[N-2] & \cdots & x_s[N-L-1] \\ x_s[1] & \cdots & x_s[L] \\ \vdots & \ddots & \vdots \\ x_s[N-L] & \cdots & x_s[N-1] \end{bmatrix} \quad (2)$$

where L is the number of modeled poles, and N is the number of the synthesized receive channels. The number of poles corresponds to the number of targets, which can be differed. The number of the synthesized channels is the number of receive channels $N_{RX}$ multiplied by the number of transmitters $N_{TX}$. The coefficients can be calculated by $\alpha = -(X^H X)^{-1} X^H x$, where the vector x is $x = [x_s[L] \ldots x_s[N-1] \, x_s^*[0] \ldots x_s^*[N-L-1]]^T$.

In this example two poles can be modeled (L=2) and the matrix simplifies to:

$$X = \begin{bmatrix} x_s[1] & x_s[0] \\ x_s[2] & x_s[1] \\ x_s^*[1] & x_s^*[2] \\ x_s^*[2] & x_s^*[3] \end{bmatrix}, \quad (3)$$

where the vector x is $x = \lfloor x_s[2] \, x_s[3] \, x_s^*[0] \, x_s^*[1] \rfloor$.

In 1116, with the help of the Levinson-Durbin algorithm, the coefficients can be calculated in a recursive manner with reduced computational effort (i.e., the Burg method). The poles can be calculated directly from the coefficients a, according to:

$$r_{1,2} = \frac{1 a_1 \pm \sqrt{a_1^2 - 4 a_2}}{2} \quad (4)$$

In 1118 the angle of incidence $\theta_{1,2}$ for the targets can be calculated. In one embodiment, this is performed according to:

$$\theta_{1,2} = \sin^{-1}\left(\frac{\angle r_{1,2} \lambda}{2\pi d}\right) \quad (5)$$

where $\angle r_{1,2}$ is the angle of the calculated roots from (4), $\lambda$ is the wavelength of the transmitted signal, and d is the distance between phase centers of the receive channels.

Finally, in 1120, a decision is made whether there is one target or multiple targets present. To achieve this, the amplitude for each of the detected poles is calculated. In this example, the complex amplitudes A can be obtained using the matrix:

$$X_A = \begin{bmatrix} r_1^1 & r_2^1 \\ r_1^2 & r_2^2 \\ r_1^3 & r_2^3 \\ r_1^4 & r_2^4 \end{bmatrix};$$ (6)

$$A = (X_A^H X_A)^{-1} X_A^H \begin{bmatrix} x_s[0] \\ x_s[1] \\ x_s[2] \\ x_s[3] \end{bmatrix}.$$ (7)

The magnitudes can be normalized. Additionally, the magnitudes A can be compared to the transfer function $$H(z) = \frac{1}{1 + a_1 z^{-1} + a_2 z^{-2}}.$$

Figure 12:
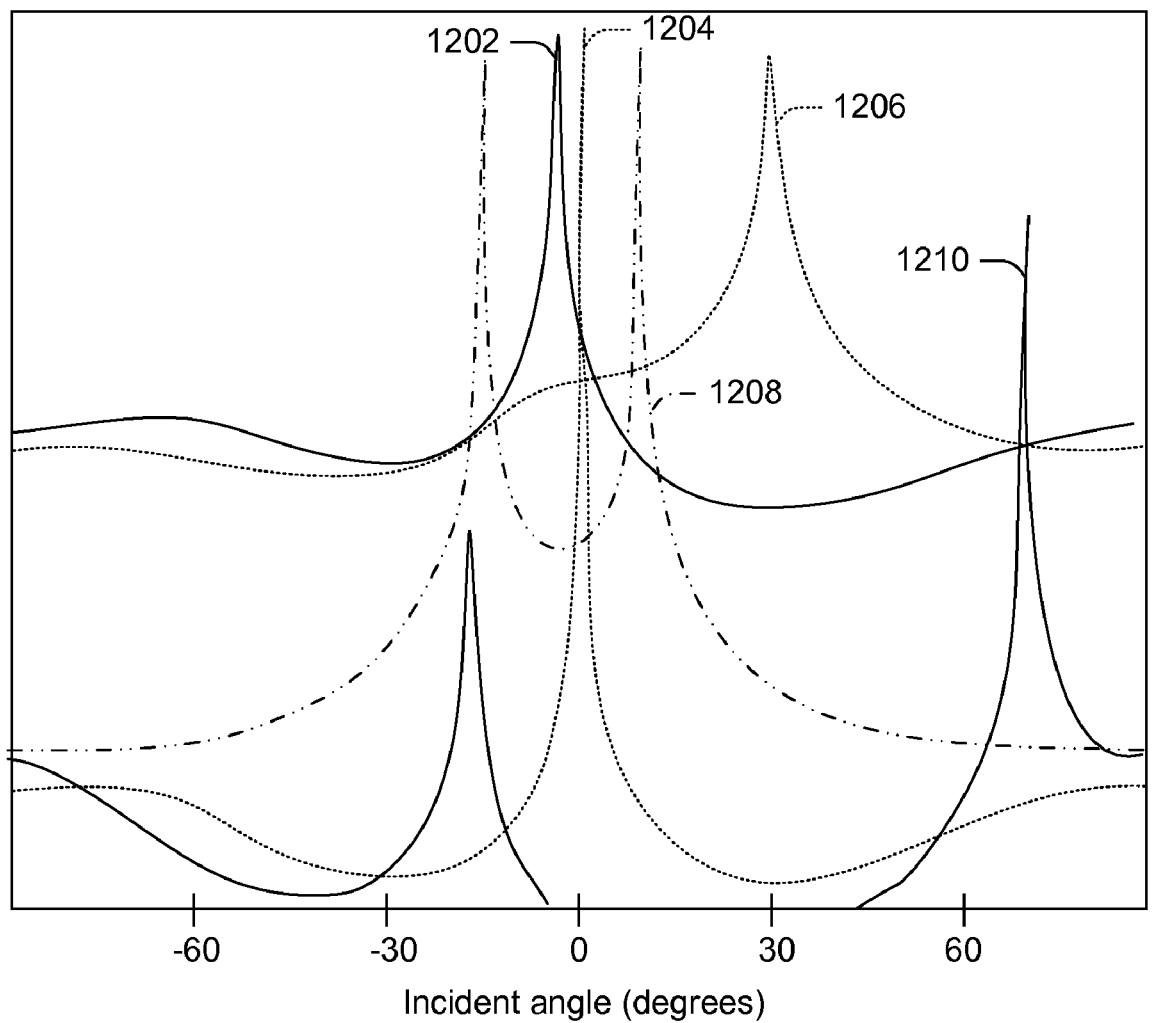
FIG. 12 is a graphical plot showing several simulation examples in accordance with one example of short range detection.

A simulation example for several sets of short-range targets detected with this method is shown in FIG. 12. For example, the first curve 1202 shows a simulation example with a single target at an incident angle of approximately −5 degrees relative to normal to the aperture plane of the transceiver. The second curve 1204 shows a simulation example with a single target at an incident angle of approximately 0 degrees. The third curve 1206 shows a single target at an incident angle of approximately 30 degrees. The fourth curves 1208 shows a pair of targets at approximately 10 degrees and −15 degrees, respectively. The fifth curve 1210 shows a pair of targets at incident angles of approximately 70 degrees and −20 degrees. The magnitude for each peak is generally proportional to the cross-sectional radar area of the target associated therewith. Therefore, in this or other manners, improved angle detection can be realized during the second mode.

In order to provide accurate angle detection, a phase and amplitude calibration of the transmit and receive channels can be performed. As will be discussed further herein, the calibration can be performed with the help of on-board calibration structures, which can comprise directional couplers and power combiners. This calibration can be used to correct slight phase shifts, such as those encountered in the transceiver itself, to ensure that accurate angle detection is achieved.

Figure 13:
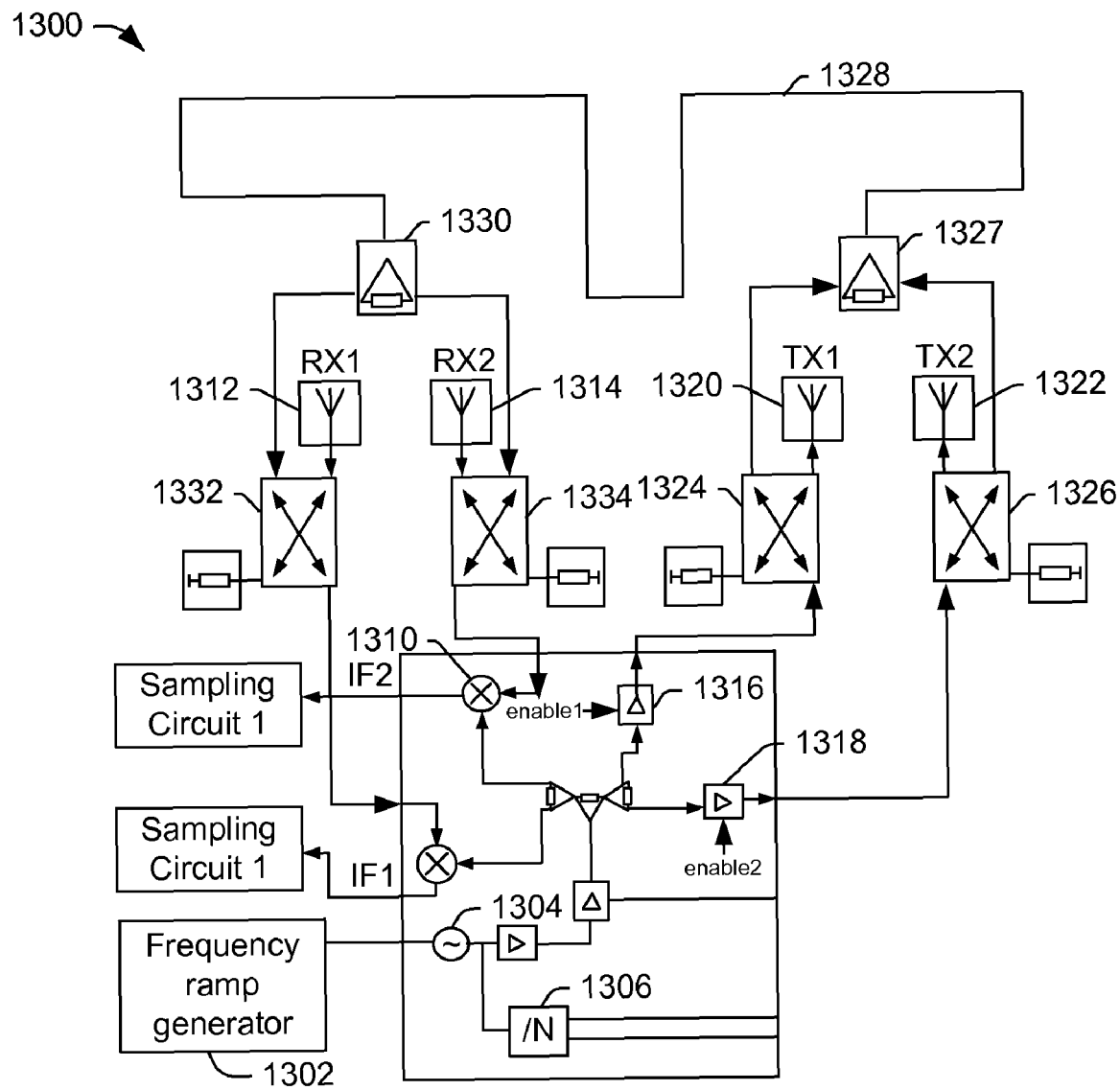
FIG. 13 illustrates one embodiment of a circuit for carrying out a calibration.

FIG. 13 shows one circuit 1300 for carrying out the calibration. As shown, the circuit 1300 includes a frequency ramp generator 1302; a 1304 VCO with a divider 1306; first and second mixers 1308, 1310 associated with first and second receive antennas 1312, 1314, respectively; and first and second output amplifiers 1316, 1318 associated with the transmit antennas 1320, 1322, respectively. First and second directional couplers 1324, 1326 selectively branch the transmitted signals between the transmit antennas 1320, 1322 and a power combiner 1327. The power combiner 1327 feeds a delay line 1328, which is then coupled to a signal splitter 1330. The signal splitter 1330 works in conjunction with third and fourth directional couplers 1332, 1334 to deliver a calibration signal. The delay line 1328 is advantageous in that it separates the calibration signal from other parasitic coupling effects.

Figure 14:
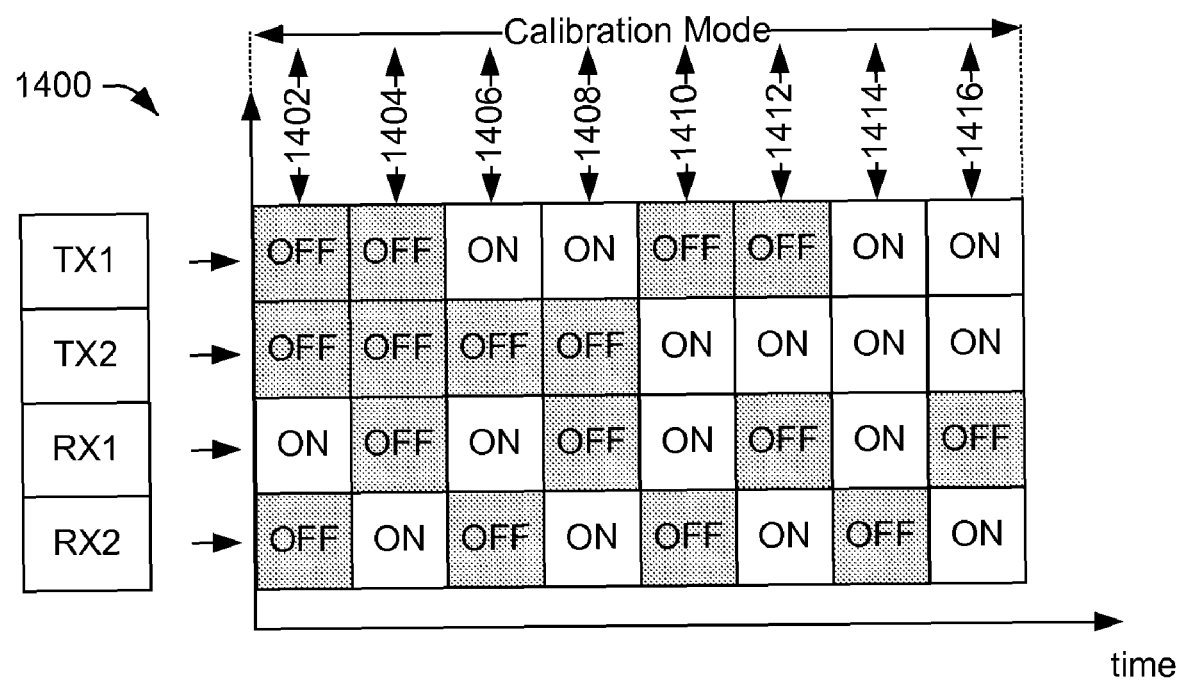
FIG. 14 illustrates one embodiment of a turning transmit and receive channels on and off to achieve calibration.

During a calibration mode, such as shown in FIG. 14, a calibration signal is transmitted over the delay line 1328 according to a sequence that allows for accurate phase and frequency calibration. In the embodiment of FIG. 14, each unique linear combination of transmit and receive channels is independently characterized with a calibration signal. The resultant down-converted or baseband signals IF1, IF2 are then sampled, and an FFT is performed thereon. A calibration signal, $s_{cal}(k)$, will appear as a peak in the FFT and can be measured for all linear combinations:

at time 1402 measure $S_{cal,e1}$;
at time 1404 measure $S_{cal,e2}$;
at time 1406 measure $S_{cal,TX1,RX1}$;
at time 1408 measure $S_{cal,TX1,RX2}$;
at time 1410 measure $S_{cal,TX2,RX1}$;
at time 1412 measure $S_{cal,TX2,RX2}$;
at time 1414 measure $S_{cal,TX12,RX1}$;
at time 1416 measure $S_{cal,TX12,RX2}$.

The phase and amplitude imbalance between the receiving channels RX1, RX2 can be determined by:

$$I_{RX,1} = \frac{S_{cal,TX1,RX2} - S_{cal,e2}}{S_{cal,TX1,RX1} - S_{cal,e1}}; \text{ and}$$

$$I_{RX,2} = \frac{S_{cal,TX2,RX2} - S_{cal,e2}}{S_{cal,TX1,RX2} - S_{cal,e2}}$$

Somewhat analogously, the phase and amplitude imbalance between the transmitting channels TX1, TX2 can be determined by:

$$I_{TX,1} = \frac{S_{cal,TX2,RX1} - S_{cal,e1}}{S_{cal,TX1,RX1} - S_{cal,e1}}; \text{ and}$$

$$I_{TRX,2} = \frac{S_{cal,TX2,RX2} - S_{cal,e2}}{S_{cal,TX1,RX2} - S_{cal,e2}}$$

The values $S_{cal,TX12,RX1}$ and $S_{cal,TX12,RX2}$ can be used to check if a linear supposition for the received signal occurs, or if there are thermal effects due to the output buffers to account for. The dual mode transceiver can switch among the calibration mode, long range mode, and short range mode at regular or other intervals. In this way, the calibration mode can continuously monitor and correct for dynamic operating conditions in the radar system.

Figure 15:
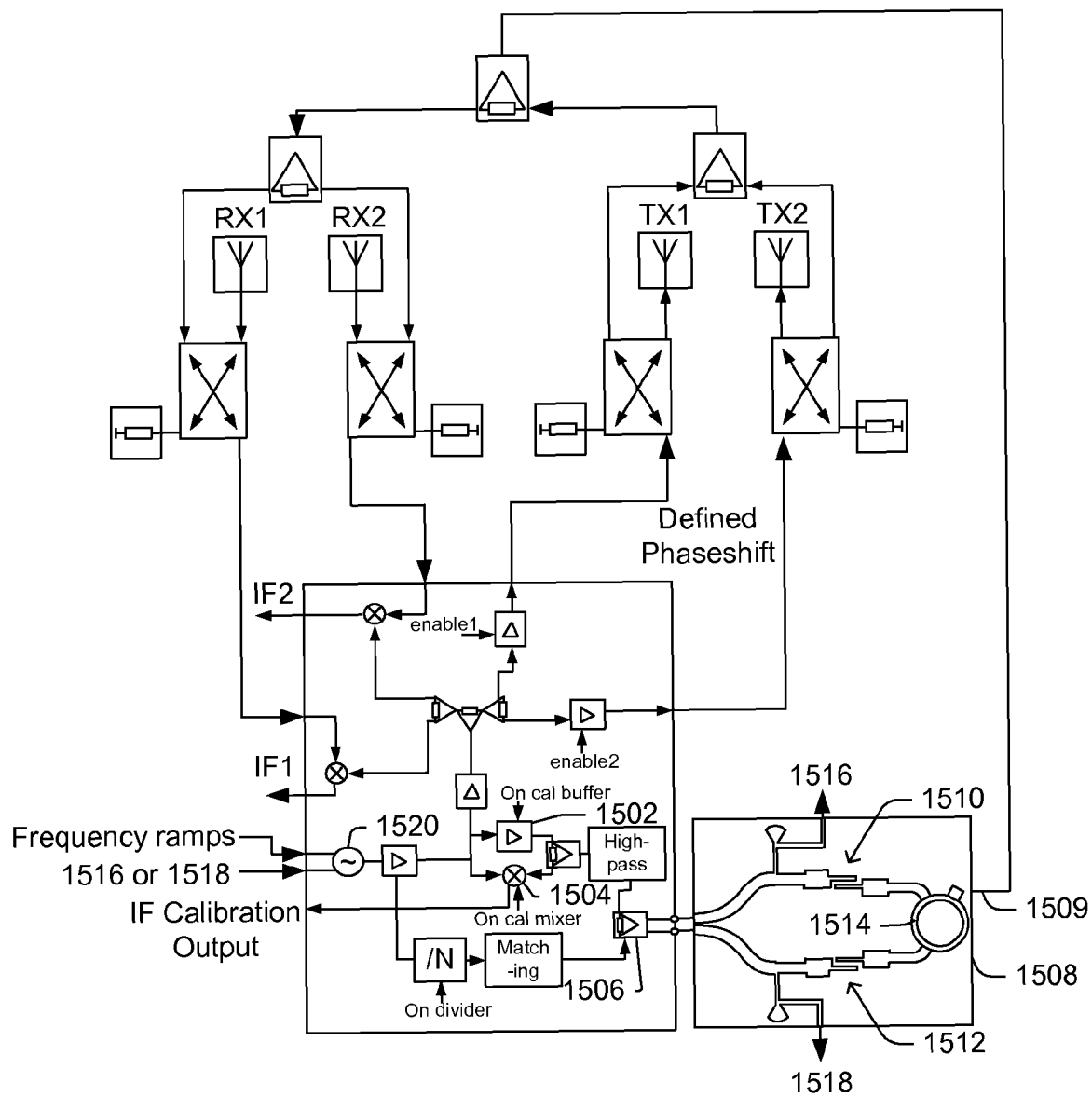
FIG. 15 illustrates another embodiment of a circuit for carrying out a calibration.

FIG. 15 shows an improvement in the calibration can be achieved if an additional output buffer 1502 and calibration mixer 1504 are used. To measure the phase shift between TX1 and TX2, the calibration mixer 1504 is turned off. To determine the phase shift between RX1 and RX2 the calibration mixer 1504 is turned on and this additional signal is compared in both receive channels. To save space, the calibration signals can be multiplexed with a low-frequency channel, e.g., the divided VCO signal. In the illustrated embodiment, power combiner 1506 has a differential output. Transformation circuitry 1508 can transform this differential output signal into a single-ended output signal 1509. This transformation circuitry 1508 includes two symmetric legs with filter circuits 1510, 1512 along each leg. The filter circuits 1510, 1512 are coupled to a balun 1514 that transforms the filtered differential signals into the single-ended signal. The transformation circuitry 1508 also produces two complementary divider signals 1516, 1518 either of which could be fed back to the VCO 1520. The VCO 1520 can use the selected divider signal along with the frequency ramps to set the frequency of the transmitted outgoing signals. This calibration scheme could also be extended to higher number of transmit channels.

Some methods and corresponding features of the present disclosure can be performed by hardware modules, software routines, or a combination of hardware and software. To the extent that software is employed, for example by a baseband processor or other processor associated with the radar system, the software may be provided via a "computer readable medium", which includes any medium that participates in providing instructions to the processor. Such a computer readable medium may take numerous forms, including but not limited to, non-volatile media, volatile media, and transmission media. Non-volatile media includes, for example, optical disks (such as CDs, DVDs, etc.) or magnetic disks (such as floppy disks, tapes, etc.). Volatile media includes dynamic memory, such as ferroelectric memory, SRAM, or DRAM. Transmission media includes coaxial cables, copper wire, fiber optics, etc. that could deliver the instructions over a network or between communication devices. Transmission media can also include electromagnetic waves, such as a voltage wave, light wave, or radio wave.

Although the invention has been illustrated and described with respect to one or more implementations, alterations and/or modifications may be made to the illustrated examples without departing from the spirit and scope of the appended claims. Generally speaking, when used in the short-range mode, a radar system with more channels would be able to use angle detection to resolve more targets than a radar system with fewer channels. When used in the long-range mode, by contrast, a radar system with more channels will be able to detect targets at greater ranges than a radar system with fewer channels. Thus, radar system performance tends to increase as more channels are added. Although a radar system with more channels provides for greater performance, however, it may also cost more due to a greater number of components and complexities associated therewith. Therefore, as with most systems, there is a tradeoff between performance and cost.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A dual mode radar transceiver, comprising:
a plurality of transmit channels, each of the plurality of transmit channels adapted to switch between a first mode and a second mode;
wherein during the first mode first combination of the plurality of transmit channels are configured to concurrently transmit outgoing signals; and
wherein during the second mode a plurality of different combinations of the plurality of transmit channels are configured to concurrently transmit outgoing signals, wherein each of the plurality of different combinations has fewer transmit channels concurrently transmitting than the first combination.

2. The radar transceiver of claim 1, wherein the radar transceiver is configured to provide a first angle accuracy in the first mode and a second angle accuracy in the second mode, the first angle accuracy being less than the second angle accuracy.

3. The radar transceiver of claim 2, wherein the radar transceiver is configured to detect targets within a first range in the first mode and a second range in the second mode, the first range being larger than the second range.

4. The radar transceiver of claim 1, wherein the radar transceiver is configured to transmit the outgoing signals over a first bandwidth in the first mode and a second bandwidth in the second mode, the first bandwidth being wider than the second bandwidth.

5. The radar transceiver of claim 1, wherein the radar transceiver is configured to be included in an automotive radar system.

6. The radar transceiver of claim 1, further comprising:
a plurality of receive channels, wherein each receive channel is configured to receive a scattered signal related to an outgoing signal.

7. The radar transceiver of claim 6,
wherein a first distance separates phase centers of adjacent receive channels; and
wherein a second distance separates phase centers of adjacent transmit channels, the second distance about twice the first distance.

8. The radar transceiver of claim 6, further comprising:
a plurality of mixers, each of the plurality of mixers associated with one of the plurality of receive channels, wherein each multiple mixer is adapted to mix a scattered signal with an outgoing signal to provide a baseband signal enabling the plurality of receive channels to receive scattered signals concurrently.

9. The radar transceiver of claim 8, further comprising:
a first filtering circuit adapted to filter the baseband signals during the first mode; and
a second filtering circuit adapted to filter the baseband signals during the second mode.

10. A dual mode radar system, comprising:
first and second transmit channels configured to transmit outgoing signals during a first mode and a second mode;
wherein the first mode includes a first time period during which both the first and second transmit channels are configured to concurrently transmit outgoing signals; and
wherein a second mode includes a second time period during which the first transmit channel is configured to be on while the second transmit channel is configured to be off, and a third time period during which the first transmit channel is configured to be on while the second transmit channel is configured to be off.

11. The radar system of claim 10, further comprising:
first and second receive channels that are configured to receive scattered signals.

12. The radar system of claim 11,
wherein a first distance separates a phase center of the first receive channel from a phase center of the second receive channel; and
wherein a second distance that is approximately twice the first distance separates a phase center of the first transmit channel from a phase center of the second transmit channel.

13. The radar system of claim 10, wherein
the first and second transmit channels are configured to cooperatively transmit over a first bandwidth during the second mode; and
wherein the first and second transmit channels are configured to cooperatively transmit over a second bandwidth during the first mode, the second bandwidth less than the first bandwidth.

14. The radar system of claim 10, further comprising:
at least one additional transmit channel;
wherein, during the first mode, the at least one additional transmit channel is adapted to concurrently transmit outgoing signals with the first and second transmit channels; and
wherein, during the second mode, the at least one additional transmit channel is adapted to switch on and off in a combinatorial manner with the first and second transmit channels.

15. A method for detecting spatial information of a target comprising:
during a long-range detection mode, selecting a first transmit channel configuration that includes a first combination of a plurality of transmit channels, and concurrently transmitting outgoing signals over the first combination of a plurality of transmit channels; and
during a short-range angle detection mode, changing between additional transmit channel configurations, wherein each additional transmit channel configuration has a different combination of transmit channels concurrently transmitting and has fewer transmit channels than the first combination.

16. The method of claim 15, wherein the first combination of transmit channels includes at least substantially all of the transmit channels.

17. The method of claim 15, wherein each of the additional combinations of transmit channels includes only a single transmit channel.

18. The method of claim 15, further comprising:
during the long-range detection mode, concurrently receiving scattered signals by a plurality of receive channels.

19. The method of claim 18, further comprising:
mixing the scattered signals from the plurality of receive channels with the outgoing signals to down-convert the scattered signals to baseband signals.

20. A method for detecting spatial information of a target comprising:
selectively operating in a long-range detection mode adapted to detect incident angles of targets according to a first angle accuracy; and
selectively operating in a short-range detection mode adapted to detect incident angles of targets according to a second angle accuracy that is more accurate than the first angle accuracy.

21. The method of claim 20, further comprising:
selectively operating in a calibration mode adapted to measure dynamic operating conditions associated with the long-range detection mode and short-range detection mode.

22. The method of claim 21, wherein the method intermittently switches to the calibration mode to monitor and correct for the dynamic operating conditions.

23. The method of claim 20, wherein the long-range-detection mode comprises concurrently transmitting outgoing signals over a first combination of multiple transmit channels.

24. The method of claim 23, wherein the short-range detection mode comprises changing between additional transmit channel configurations, each additional transmit channel configuration having a different combination of transmit channels and fewer transmit channels than the first combination.

25. A radar system, comprising:
transmission means for transmitting outgoing signals;
reception means for receiving scattered signals that are based on the outgoing signals; and
control means for switching the transmission means and the reception means between a long-range detection mode adapted to detect incident angles of targets according to a first angle accuracy and a short-range detection mode adapted to detect incident angles of targets according to a second angle accuracy that is more accurate than the first angle accuracy.

* * * * *